United States Patent
Watson

(10) Patent No.: US 9,950,259 B2
(45) Date of Patent: Apr. 24, 2018

(54) AMBIENT LIGHT CONTROL AND CALIBRATION VIA A CONSOLE

(71) Applicant: Sony Interactive Entertainment Inc., Tokyo (JP)

(72) Inventor: Brian M. Watson, San Francisco, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 15/698,648

(22) Filed: Sep. 8, 2017

(65) Prior Publication Data

US 2017/0368459 A1 Dec. 28, 2017

Related U.S. Application Data

(63) Continuation of application No. 13/663,262, filed on Oct. 29, 2012, now Pat. No. 9,833,707.

(51) Int. Cl.
*A63F 13/52* (2014.01)

(52) U.S. Cl.
CPC .................. *A63F 13/52* (2014.09)

(58) Field of Classification Search
CPC .......... A63F 13/12; A63F 13/30; A63F 13/54; A63F 13/22; A63F 13/23; A63F 13/52; A63F 13/213; A63F 13/215; H05B 37/02; H05B 37/0254; H05B 33/0842; H05B 33/0854; H05B 33/0857; G01S 7/497; G01S 7/52004

See application file for complete search history.

(56) References Cited

U.S. PATENT DOCUMENTS

| | | | |
|---|---|---|---|
| 3,147,341 A | 9/1964 | Gibson, Jr. |
| 3,200,193 A | 8/1965 | Biggs et al. |
| 4,016,540 A | 4/1977 | Hyatt |
| 4,090,216 A | 5/1978 | Constable |
| 4,104,625 A | 8/1978 | Bristow et al. |
| 4,355,334 A | 10/1982 | Fitzgibbon et al. |
| 4,445,187 A | 4/1984 | Best |
| 4,475,132 A | 10/1984 | Rodesch |

(Continued)

FOREIGN PATENT DOCUMENTS

| CN | 1201180 A | 12/1998 |
|---|---|---|
| CN | 1385783 A | 12/2002 |

(Continued)

OTHER PUBLICATIONS

Arcadia, vol. 2, No. 12, Enterbrain, Inc., Dec. 1, 2001, pp. 56-63.

(Continued)

*Primary Examiner* — Haissa Philogene
(74) *Attorney, Agent, or Firm* — Carr & Ferrell LLP

(57) ABSTRACT

Ambient light control and calibration systems and methods are provided herein. According to some embodiments, exemplary systems may include a console that includes a processor that executes logic to control a plurality of nodes to reproduce a virtual lighting scheme of a virtual environment in a physical user environment. Additionally, the system may include a plurality of nodes that each includes a light emitting device, a receiver that communicatively couples the node to the console, and a processor that executes logic to control the light emitting device.

19 Claims, 3 Drawing Sheets

(56) References Cited

U.S. PATENT DOCUMENTS

| | | |
|---|---|---|
| 4,514,727 A | 4/1985 | Van Antwerp |
| 4,569,026 A | 2/1986 | Best |
| 4,677,569 A | 6/1987 | Nakano et al. |
| 4,704,696 A | 11/1987 | Reimer et al. |
| 4,752,069 A | 6/1988 | Okada |
| 4,757,525 A | 7/1988 | Matthews et al. |
| 4,952,917 A | 8/1990 | Yabuuchi |
| 5,057,744 A | 10/1991 | Barbier et al. |
| 5,167,010 A | 11/1992 | Elm et al. |
| 5,241,671 A | 8/1993 | Reed et al. |
| 5,274,560 A | 12/1993 | LaRue |
| 5,321,833 A | 6/1994 | Chang et al. |
| 5,358,259 A | 10/1994 | Best |
| 5,377,997 A | 1/1995 | Wilden et al. |
| 5,405,152 A | 4/1995 | Katanics et al. |
| 5,446,714 A | 8/1995 | Yoshio et al. |
| 5,498,002 A | 3/1996 | Gechter |
| RE35,314 E | 8/1996 | Logg |
| 5,598,297 A | 1/1997 | Yamanaka et al. |
| 5,617,407 A | 4/1997 | Bareis |
| 5,649,861 A | 7/1997 | Okano et al. |
| 5,659,732 A | 8/1997 | Kirsch |
| 5,704,837 A | 1/1998 | Iwasaki et al. |
| 5,724,567 A | 3/1998 | Rose et al. |
| 5,732,232 A | 3/1998 | Brush, II et al. |
| 5,765,150 A | 6/1998 | Burrows |
| 5,786,801 A | 7/1998 | Ichise |
| 5,802,361 A | 9/1998 | Wang et al. |
| 5,818,553 A | 10/1998 | Koenck et al. |
| 5,823,879 A | 10/1998 | Goldberg et al. |
| 5,870,740 A | 2/1999 | Rose et al. |
| 5,890,122 A | 3/1999 | Van Kleeck et al. |
| 5,947,823 A | 9/1999 | Nimura |
| 5,948,040 A | 9/1999 | DeLorme et al. |
| 5,974,412 A | 10/1999 | Hazlehurst et al. |
| 5,977,968 A | 11/1999 | Le Blanc |
| 6,001,013 A | 12/1999 | Ota |
| 6,012,053 A | 1/2000 | Pant et al. |
| 6,017,272 A | 1/2000 | Rieder |
| 6,067,539 A | 5/2000 | Cohen |
| 6,098,061 A | 8/2000 | Gotoh et al. |
| 6,155,924 A | 12/2000 | Nakagawa et al. |
| 6,168,524 B1 | 1/2001 | Aoki et al. |
| 6,183,366 B1 | 2/2001 | Goldberg et al. |
| 6,202,058 B1 | 3/2001 | Rose et al. |
| 6,210,273 B1 | 4/2001 | Matsuno |
| 6,264,560 B1 | 7/2001 | Goldberg et al. |
| 6,273,818 B1 | 8/2001 | Komoto |
| 6,283,861 B1 | 9/2001 | Kawai et al. |
| 6,296,570 B1 | 10/2001 | Miyamoto et al. |
| 6,319,121 B1 | 11/2001 | Yamada et al. |
| 6,327,590 B1 | 12/2001 | Chidlovskii et al. |
| 6,363,378 B1 | 3/2002 | Conklin et al. |
| 6,366,272 B1 | 4/2002 | Rosenberg et al. |
| 6,375,571 B1 | 4/2002 | Ohnuma et al. |
| 6,409,604 B1 | 6/2002 | Matsuno |
| 6,413,163 B1 | 7/2002 | Yamauchi et al. |
| 6,419,580 B1 | 7/2002 | Ito |
| 6,428,411 B1 | 8/2002 | Togami |
| 6,434,556 B1 | 8/2002 | Levin et al. |
| 6,456,977 B1 | 9/2002 | Wang |
| 6,508,706 B2 | 1/2003 | Sitrick et al. |
| 6,529,875 B1 | 3/2003 | Nakajima et al. |
| 6,533,663 B1 | 3/2003 | Iwao et al. |
| 6,538,666 B1 | 3/2003 | Ozawa et al. |
| 6,554,707 B1 | 4/2003 | Sinclair et al. |
| 6,556,983 B1 | 4/2003 | Altschuler et al. |
| 6,571,208 B1 | 5/2003 | Kuhn et al. |
| 6,572,478 B2 | 6/2003 | Miyamoto et al. |
| 6,582,230 B1 | 6/2003 | Aoshima et al. |
| 6,582,309 B2 | 6/2003 | Higurashi et al. |
| 6,585,599 B1 | 7/2003 | Horigami et al. |
| 6,652,384 B2 | 11/2003 | Kondo et al. |
| 6,684,127 B2 | 1/2004 | Fujita et al. |
| 6,705,945 B2 | 3/2004 | Gavin et al. |
| 6,729,954 B2 | 5/2004 | Atsumi et al. |
| 6,899,628 B2 | 5/2005 | Leen et al. |
| 6,920,426 B2 | 7/2005 | Takechi |
| 6,928,433 B2 | 8/2005 | Goodman et al. |
| 6,935,954 B2 | 8/2005 | Sterchi et al. |
| 6,966,832 B2 | 11/2005 | Leen et al. |
| 6,979,267 B2 | 12/2005 | Leen et al. |
| 7,029,394 B2 | 4/2006 | Leen et al. |
| 7,062,561 B1 | 6/2006 | Reisman |
| 7,085,722 B2 | 8/2006 | Luisi |
| 7,137,891 B2 | 11/2006 | Neveu et al. |
| 7,155,157 B2 | 12/2006 | Kaplan |
| 7,172,118 B2 | 2/2007 | Urken |
| 7,180,529 B2 | 2/2007 | Covannon et al. |
| 7,202,613 B2 | 4/2007 | Morgan et al. |
| 7,233,904 B2 | 6/2007 | Luisi |
| 7,438,642 B2 | 10/2008 | Walker et al. |
| 7,452,273 B2 | 11/2008 | Amaitis et al. |
| 7,455,589 B2 | 11/2008 | Neveu et al. |
| 7,572,187 B2 | 8/2009 | Van Luchene |
| 7,613,616 B2 | 11/2009 | Luisi |
| 7,717,782 B2 | 5/2010 | Van Luchene |
| 7,731,589 B2 | 6/2010 | Kataoka et al. |
| 7,764,026 B2 | 7/2010 | Dowling et al. |
| 7,880,746 B2 | 2/2011 | Marks et al. |
| 7,946,909 B2 | 5/2011 | Neveu et al. |
| 7,965,859 B2 | 6/2011 | Marks |
| 8,295,549 B2 | 10/2012 | Marks et al. |
| 8,442,403 B2 | 5/2013 | Weaver |
| 8,714,983 B2 | 5/2014 | Kil |
| 8,964,298 B2 * | 2/2015 | Haddick .................. G06F 3/013 |
| | | 359/630 |
| 9,108,108 B2 | 8/2015 | Zalewski et al. |
| 9,126,116 B2 | 9/2015 | Turner et al. |
| 9,155,960 B2 | 10/2015 | Argiro |
| 9,833,707 B2 * | 12/2017 | Watson .................. A63F 13/52 |
| 2001/0009867 A1 | 7/2001 | Sakaguchi et al. |
| 2002/0068626 A1 | 6/2002 | Takeda et al. |
| 2002/0082065 A1 | 6/2002 | Fogel et al. |
| 2002/0103031 A1 | 8/2002 | Neveu et al. |
| 2002/0169617 A1 | 11/2002 | Luisi |
| 2003/0109305 A1 | 6/2003 | Gavin et al. |
| 2004/0029625 A1 | 2/2004 | Annunziata |
| 2004/0166935 A1 | 8/2004 | Gavin et al. |
| 2005/0054290 A1 | 3/2005 | Logan et al. |
| 2006/0039017 A1 | 2/2006 | Park et al. |
| 2006/0178179 A1 | 8/2006 | Neveu et al. |
| 2006/0190270 A1 | 8/2006 | Luisi |
| 2007/0037605 A1 | 2/2007 | Logan |
| 2007/0060231 A1 | 3/2007 | Neveu et al. |
| 2007/0087797 A1 | 4/2007 | Van Luchene |
| 2007/0244704 A1 | 10/2007 | Luisi |
| 2007/0257928 A1 | 11/2007 | Marks et al. |
| 2007/0279427 A1 | 12/2007 | Marks |
| 2008/0064019 A1 | 3/2008 | Kaufman et al. |
| 2008/0109491 A1 | 5/2008 | Gupta |
| 2008/0167106 A1 | 7/2008 | Lutnick et al. |
| 2009/0063463 A1 | 3/2009 | Turner et al. |
| 2010/0041475 A1 | 2/2010 | Zalewski et al. |
| 2010/0111374 A1 | 5/2010 | Stoica |
| 2010/0138764 A1 | 6/2010 | Hatambeiki et al. |
| 2010/0171430 A1 | 7/2010 | Seydoux |
| 2010/0213873 A1 | 8/2010 | Picard et al. |
| 2010/0241496 A1 | 9/2010 | Gupta et al. |
| 2010/0312366 A1 | 12/2010 | Madonna et al. |
| 2014/0121009 A1 | 5/2014 | Watson |
| 2014/0132628 A1 * | 5/2014 | Hoff, III .................. G06F 3/147 |
| | | 345/633 |
| 2014/0135631 A1 | 5/2014 | Brumback et al. |
| 2014/0142403 A1 | 5/2014 | Brumback et al. |
| 2014/0191848 A1 | 7/2014 | Imes et al. |
| 2014/0329613 A1 | 11/2014 | Savarese et al. |
| 2014/0361872 A1 | 12/2014 | Garcia et al. |
| 2015/0304804 A1 | 10/2015 | Lotito |
| 2015/0347738 A1 | 12/2015 | Ulrich et al. |
| 2016/0018934 A1 | 1/2016 | Turner et al. |

(56) References Cited

U.S. PATENT DOCUMENTS

| | | |
|---|---|---|
| 2016/0057565 A1 | 2/2016 | Gold |
| 2016/0282899 A1 | 9/2016 | Inagaki et al. |

FOREIGN PATENT DOCUMENTS

| | | |
|---|---|---|
| CN | 1848742 A | 10/2006 |
| CN | 101836362 A | 9/2010 |
| CN | 101849436 A | 9/2010 |
| CN | 101968827 A | 2/2011 |
| CN | 101968827 B | 5/2014 |
| CN | 104797311 A | 7/2015 |
| DE | 19905076 A1 | 6/2002 |
| EP | 0789296 A1 | 8/1997 |
| EP | 0850673 A1 | 7/1998 |
| EP | 0898237 A2 | 2/1999 |
| EP | 0901803 A1 | 3/1999 |
| EP | 0913175 A2 | 5/1999 |
| EP | 1029569 A2 | 8/2000 |
| EP | 1078661 A1 | 2/2001 |
| EP | 1262955 A2 | 12/2002 |
| EP | 1355707 A1 | 10/2003 |
| EP | 1388357 A2 | 2/2004 |
| EP | 1434627 A1 | 7/2004 |
| EP | 1630754 A1 | 3/2006 |
| EP | 1650706 A1 | 4/2006 |
| EP | 1793588 A1 | 6/2007 |
| EP | 1262955 B1 | 3/2010 |
| EP | 2322257 A2 | 5/2011 |
| GB | 2355627 A | 9/1998 |
| GB | 2351637 A | 1/2001 |
| GB | 2356785 A | 5/2001 |
| GB | 2411065 A | 8/2005 |
| JP | S59202779 A | 11/1984 |
| JP | H07178246 A | 7/1995 |
| JP | H08155140 A | 6/1996 |
| JP | H09265379 A | 10/1997 |
| JP | H10272258 A | 10/1998 |
| JP | H10295935 A | 11/1998 |
| JP | H11000467 A | 1/1999 |
| JP | H11070273 A | 3/1999 |
| JP | H11119791 A | 4/1999 |
| JP | H11197359 A | 7/1999 |
| JP | 2000024322 A | 1/2000 |
| JP | 2000116946 A | 4/2000 |
| JP | 2000176154 A | 6/2000 |
| JP | 2000334168 A | 12/2000 |
| JP | 2001009156 A | 1/2001 |
| JP | 2001029649 A | 2/2001 |
| JP | 2001079265 A | 3/2001 |
| JP | 2001157779 A | 6/2001 |
| JP | 2001198350 A | 7/2001 |
| JP | 2002052256 A | 2/2002 |
| JP | 2002085835 A | 3/2002 |
| JP | 2002092474 A | 3/2002 |
| JP | 2002159740 A | 6/2002 |
| JP | 2002166048 A | 6/2002 |
| JP | 2002191868 A | 7/2002 |
| JP | 2003047768 A | 2/2003 |
| JP | 2003228585 A | 8/2003 |
| JP | 2004529678 A | 9/2004 |
| JP | 2005505357 A | 2/2005 |
| JP | 3741687 B2 | 2/2006 |
| JP | 2006031670 A | 2/2006 |
| JP | 2006087459 A | 4/2006 |
| JP | 2006099125 A | 4/2006 |
| JP | 3865721 B2 | 1/2007 |
| JP | 2007249899 A | 9/2007 |
| JP | 2011025044 A | 2/2011 |
| JP | 5580131 B2 | 8/2014 |
| KR | 1020000072753 A | 12/2000 |
| KR | 100464877 B1 | 12/2004 |
| KR | 100469822 B1 | 1/2005 |
| KR | 1020020044919 A | 6/2005 |
| KR | 1020070052493 A | 9/2008 |
| KR | 101226305 B1 | 1/2013 |
| WO | WO1994018790 A1 | 8/1994 |
| WO | WO9714102 A1 | 4/1997 |
| WO | WO2001082626 A1 | 11/2001 |
| WO | WO2002060548 A2 | 8/2002 |
| WO | WO2003031003 A1 | 4/2003 |
| WO | WO2005040900 A1 | 5/2005 |
| WO | WO2006033360 A1 | 3/2006 |
| WO | WO2007130641 A2 | 11/2007 |
| WO | WO2009052659 A1 | 4/2009 |
| WO | WO2009060376 A1 | 5/2009 |
| WO | WO2014070677 A2 | 5/2014 |

OTHER PUBLICATIONS

Konami Corporation, Konami Official Guide Perfect Series, Tokimeki Memorial—Forever with You: Official Guide, First Edition, Jun. 29, 1997, 19 pages [37 pages with translation].

Login, vol. 21, No. 4, Enterbrain, Inc. Apr. 1, 2002, pp. 70-77.

Reynolds, Craig, "Flocks, Herds, and Schools: A Distributed Behavioral Model," Proceedings of SIGGRAPH '87, Computer Graphics 21(4), Jul. 1987, 13 pages.

Reynolds, Craig, "Interaction with Groups of Autonomous Characters," Proceedings of Game Developer Conference 2000, San Francisco, CA 2000, 12 pages.

Reynolds, Craig, "Steering Behaviors for Autonomous Characters," Proceedings of Game Developers Conference 1999, 21 pages.

Super Mario Brothers: Complete Cheat Book, Tokuma Publishing Co., Ltd., Nov. 20, 1985, p. 9.

Yu, Bin et al., "A Social Mechanism of Reputation Management in Electronic Communities," Proceedings of 4th International Workshop on Cooperative Information Agents, 2000, 12 pages.

Aguilera, S. et al., "Impaired Persons Facilities Based on a Multi-Modality Speech Processing System," Proc. on Speech & Language Tech., 1993, 4 pages.

Arons, B., "Authoring and Transcription Tools for Speech-Based Hypermedia," Proc. of American Voice I/O Society, 1991, 6 pages.

Arons, B., "Hyperspeech: Navigating in Speech-Only Hypermedia," Proc. of Hypertext, Dec. 1991, pp. 133-146.

Bennacef, S.K., A Spoken Language System for Information Retrieval Proc. of ICSLP, Sep. 1994, 4 pages.

Gauvain, J.L. et al., "Speech Recognition for an Information Kiosk," Proc. of ICSLP, 1996, 4 pages.

Gauvain, J.L. et al., "Spoken Language Component of the MASK Kiosk," Human Comfort and Security fo Information Systems, Oct. 26, 1995, 11 pages.

Gauvain, J.L. et al., "The LIMSI Continuous Speech Dictation System," Proc. ARPA Human Lang. & Technology, Apr. 1994, 6 pages.

Gauvain, J.L. et al., "The LIMSI Continuous Speech Dictation System: Evaluation on the ARPA Wall Street Journal Task," Proc. of the IEEE-ICASSP, 1994, 4 pages.

Goddeau, D. et al., "Galaxy: A Human-Language Interface to On-Line Travel Information," Proc. of ICSLP, 1994, 4 pages.

House, D., "Spoken-Language Access to Multimedia (SLAM): Masters Thesis," Oregon Graduate Inst., Dept. of CS and Eng., 1995, 59 pages.

Mostow, Jack et al., "Towards a Reading coach That Listens: Automated Detection of Oral Reading Errors", Proc. of the 11th Ntl. Conf. A.I, 1993, 6 pages.

Russell, M. et al., "Applications of Automatic Speech Recognition to Speech and Language Development in Young children," Proc. of ICSLP, 1996, 4 pages.

Lamel, L.F. et al., "Recent Developments in Spoken Language Systems for Information Retrieval," ESCA ETRW Spoken Dialog Systems, 1995, 4 pages.

Language Industry Monitor, "Janet Baker's Optimism," 1992, 2 pages.

Dorsey et al., Design and Simulation of Opera Lighting and Projection Effects, Program of Computer Graphics, Computer Graphics, Jul. 1991, vol. 25, No. 4, New York, pp. 41-50.

(56) References Cited

OTHER PUBLICATIONS

Calvert, Justin, SCEE's latest plans for its Eye Toy peripheral will effectively turn the PlayStation 2 into a videophone. First screens inside, SCEE announces Eye Toy; Chat, Game spot, http://www.gamespot.com/news/6095429.html, May 5, 2004, 1 pages.
Nayer et al., Lighting Sensitivity Display, ACM Transactions on Graphics, Oct. 2004, vol. 23, No. 4, pp. 963-979, New York, pp. 963-979.
Spagnoletti, Philips Ambilight TV, Home Entertainment, engadget, Jul. 8, 2004, 1 page.
Wikipedia Article on Diablo II, http://en.wikipedia.org/wiki/Diablo_II, 2010, 8 pages.
Diablo II Frost nova Description, http://diablo2.diablowiki.net/Frost_Nova, Oct. 30, 2009, 5 pages.
Diefendorff, "Sony's Emotionally Charged Chip", Microprocessor Report, vol. 13, No. 5, Apr. 19, 1999, 8 pages.
Sony Computer Entertainment, Inc., "Fantavision Game Manual", 2000, 18 pages.
Wikipedia, "Aimbot", http://en.wikipedia.org/wiki/Aimbot (last updated Jun. 3, 2005; last accessed Jul. 5, 2005), 1 page.
Agarwal et al., "Ranking database Queries Using User Feedback: A Neural network Approach", CS511 Project, Advanced Database Management Systems, Fall 2006, 9 pages.
Agichtein et al., "Improving Web Search Ranking by Incorporating User Behavior Information", SIGIR 2006, Aug. 6-11, ACM, 8 pages.
Bhattacharjee et al., "Incentive Based ranking Mechanisms", Position Paper, Department of Computer Science, Stanford University, 2006, 7 pages.
Chaudhuri et al., "Probabilistic Information Retrieval Approach for Ranking of Databased Query Results," 2006, 43 pages.
Chidlovskii et al., "Collaborative Re-Ranking of Search Results", Xerox Research Centre Europe, AAAI-2000, Workshop on AI for Web Search, 2001, 5 pages.
Kang et al., Establishing Value Mappings Using Statistical Models and User Feedback, CIKM '05, Oct. 31-Nov. 5, 2005, ACM, 8 pages.
W3C Working Draft Jun. 18, 2007, The XMLHttpRequest Object, W3C, http://www.w3.org/TR/2007/WD-XMLHttpRequest-20070618/, 12 pages.
European Search Report, dated Jan. 19, 2004, European Patent Application No. 02009339.9, 2 pages.
"Office Action", European Patent Application No. 02009339.9, dated Jan. 19, 2006, 5 pages.
"Office Action", European Patent Application No. 02009339.9, dated Dec. 11, 2006, 3 pages.
"Office Action", European Patent Application No. 02009339.9, dated Jul. 4, 2007, 4 pages.
"Office Action", European Patent Application No. 02009339.9, dated Sep. 17, 2008, 4 pages.
"Notice of Allowance", European Patent Application No. 02009339.9, dated Nov. 16, 2009, 33 pages.
"International Search Report", Patent Cooperation Treaty Application No. PCT/US02/32438, dated Feb. 4, 2013, 1 page.
"International Search Report" Patent Cooperation Treaty Application No. PCT/US2007/010944, dated Feb. 18, 2008, 5 pages.
"Search Report", European Application No. 02769043.7, dated Dec. 21, 2004, 4 pages.
"Office Action", European Patent Application No. 02769043.7, dated Apr. 28, 2005, 6 pages.
"Office Action", European Patent Application No. 02769043.7, dated Oct. 24, 2006, 5 pages.
"Office Action", European Patent Application No. 02769043.7, dated Jan. 31, 2007, 3 pages.
Non-Final Office Action, dated Dec. 17, 2003, U.S. Appl. No. 09/859,034, filed May 14, 2001.
Final Office Action, dated Jun. 4, 2004, U.S. Appl. No. 09/859,034, filed May 14, 2001.
Advisory Action, dated Aug. 25, 2004, U.S. Appl. No. 09/859,034, filed May 14, 2001.
Non-Final Office Action, dated Jan. 19, 2005, U.S. Appl. No. 09/859,034, filed May 14, 2001.
Final Office Action, dated Jun. 24, 2005, U.S. Appl. No. 09/859,034, filed May 14, 2001.
Advisory Action, dated Sep. 2, 2005, U.S. Appl. No. 09/859,034, filed May 14, 2001.
Notice of Allowance, dated Jan. 13, 2006, U.S. Appl. No. 09/859,034, filed May 14, 2001.
Non-Final Office Action, dated Nov. 17, 2005, U.S. Appl. No. 10/364,951, filed Feb. 11, 2003.
Final Office Action, dated May 16, 2006, U.S. Appl. No. 10/364,951, filed Feb. 11, 2003.
Advisory Action, dated Aug. 18, 2006, U.S. Appl. No. 10/364,951, filed Feb. 11, 2003.
Non-Final Office Action, dated Feb. 5, 2007, U.S. Appl. No. 10/364,951, filed Feb. 11, 2003.
Non-Final Office Action, dated Jul. 9, 2003, U.S. Appl. No. 10/268,278, filed Oct. 9, 2002.
Notice of Allowance, dated Dec. 2, 2003, U.S. Appl. No. 10/268,278, filed Oct. 9, 2002.
Non-Final Office Action, dated Dec. 30, 2004, U.S. Appl. No. 10/791,476, filed Mar. 1, 2004.
Non-Final Office Action, dated Apr. 5, 2006, U.S. Appl. No. 10/791,476, filed Mar. 1, 2004.
Final Office Action, dated Oct. 24, 2006, U.S. Appl. No. 10/791,476, filed Mar. 1, 2004.
Notice of Allowance, dated Feb. 16, 2007, U.S. Appl. No. 11/403,716, filed Apr. 13, 2006.
Non-Final Office Action, dated Feb. 25, 2003, U.S. Appl. No. 09/773,452, filed Jan. 31, 2001.
Non-Final Office Action, dated Jun. 5, 2003, U.S. Appl. No. 09/773,452, filed Jan. 31, 2001.
Final Office Action, dated Jun. 1, 2004, U.S. Appl. No. 09/773,452, filed Jan. 31, 2001.
Final Office Action, dated Sep. 24, 2004, U.S. Appl. No. 09/773,452, filed Jan. 31, 2001.
Advisory Action, dated May 4, 2005, U.S. Appl. No. 09/773,452, filed Jan. 31, 2001.
Non-Final Office Action, dated Sep. 13, 2005, U.S. Appl. No. 09/773,452, filed Jan. 31, 2001.
Final Office Action, dated Mar. 16, 2006, U.S. Appl. No. 09/773,452, filed Jan. 31, 2001.
Notice of Allowance, dated Jul. 11, 2006, U.S. Appl. No. 09/773,452, filed Jan. 31, 2001.
Non-Final Office Action, dated Jun. 2, 2008, U.S. Appl. No. 11/375,296, filed Mar. 13, 2006.
Notice of Allowance, dated Sep. 25, 2008, U.S. Appl. No. 11/375,296, filed Mar. 13, 2006.
Non-Final Office Action, dated Mar. 25, 2010, U.S. Appl. No. 11/624,886, filed Jan. 19, 2007.
Final Office Action, dated Aug. 24, 2010, U.S. Appl. No. 11/624,886, filed Jan. 19, 2007.
Notice of Allowance, dated Feb. 18, 2011, U.S. Appl. No. 11/624,886, filed, Jan. 19, 2007.
Non-Final Office Action, dated May 2, 2008, U.S. Appl. No. 11/591,314, filed Oct. 31, 2006.
Non-Final Office Action, dated Aug. 2, 2010, U.S. Appl. No. 11/591,314, filed Oct. 31, 2006.
Notice of Allowance, dated Jan. 13, 2011, U.S. Appl. No. 11/591,314, filed Oct. 31, 2006.
Notice of Allowance, dated Sep. 18, 2009, U.S. Appl. No. 11/764,795, filed Jun. 18, 2007.
Non-Final Office Action, dated Apr. 1, 2011, U.S. Appl. No. 11/850,516, filed Sep. 5, 2007.
Final Office Action, dated Sep. 15, 2011, U.S. Appl. No. 11/850,516, filed Sep. 5, 2007.
Non-Final Office Action, dated Dec. 3, 2013, U.S. Appl. No. 11/850,516, filed Sep. 5, 2007.
Notice of Allowance, dated Jun. 19, 2014, U.S. Appl. No. 11/850,516, filed Sep. 5, 2007.
Non-Final Office Action, dated Aug. 11, 2014, U.S. Appl. No. 11/850,516, filed Sep. 5, 2007.

(56) References Cited

OTHER PUBLICATIONS

Notice of Allowance, dated Jan. 16, 2015, U.S. Appl. No. 11/850,516, filed Sep. 5, 2007.
Non-Final Office Action, dated Dec. 3, 2013, U.S. Appl. No. 12/509,848, filed Jul. 27, 2009.
Non-Final Office Action, dated May 29, 2014, U.S. Appl. No. 12/509,848, filed Jul. 27, 2009.
Non-Final Office Action, dated Sep. 19, 2014, U.S. Appl. No. 12/509,848, filed Jul. 27, 2009.
Final Office Action, dated Feb. 25, 2015, U.S. Appl. No. 12/509,848, filed Jul. 27, 2009.
Notice of Allowance, dated Jun. 19, 2015, U.S. Appl. No. 12/509,848, filed Jul. 27, 2009.
Non-Final Office Action, dated Sep. 12, 2016, U.S. Appl. No. 13/663,262, filed Oct. 29, 2012.
Non-Final Office Action, dated May 9, 2017, U.S. Appl. No. 13/663,262, filed Oct. 29, 2012.
Notice of Allowance, dated Sep. 19, 2017, U.S. Appl. No. 13/663,262, filed Oct. 29, 2012.
"International Search Report" Patent Cooperation Treaty Application No. PCT/US02/02710, dated Sep. 12, 2002, 3 pages.
"Office Action", European Patent Application No. 02704295.1, dated Apr. 23, 2004, 3 pages.
"Office Action", European Patent Application No. 02704295.1, dated Dec. 15, 2004, 4 pages.
"Office Action", European Patent Application No. 02704295.1, dated Apr. 12, 2006, 10 pages.
"Office Action", China Patent Application No. 201010245413.8, dated Sep. 7, 2012, 3 pages [11 pages with translation].
"Office Action", European Patent Application No. 10007803.9, dated Aug. 8, 2013, 6 pages.
"Office Action", Japan Patent Application No. 2010-167803, dated Mar. 26, 2013, 3 pages [6 pages with translation].
Rejection dated Mar. 16, 2012 in KR Application No. 10-2010-0072613.
"International Search Report & Written Opinion", Patent Cooperation Treaty Application No. PCT/US2013/067135, dated May 1, 2014, 18 pages.
Rejection dated Mar. 2, 2004 in KR Application No. 10-2002-00265621.
Decision to Grant dated Oct. 5, 2005 in JP Application 2002-5607373.
Rejection dated Nov. 16, 2003 in JP Application 2002-5607373.
"Office Action", China Patent Application No. 201010245413.8, dated Nov. 5, 2013, 4 pages [12 pages with translation].
"European Search Report", European Patent Application No. 03254168.2, dated Apr. 23, 2004, 3 pages.
"Office Action", European Patent Application No. 03254168.2, dated Sep. 29, 2006, 4 pages.
Stern, Andrew. Virtual Babyz: Believeable agents with Narrative Intelligence, Narrative Intelligence AAAI Symposium, Nov. 1999. Online. Viewed Apr. 28, 2006. http://www.cs.cmu.edu/afs/cs/user/michaelm/www/nidocs/Stern.html, 7 pages.
"Babyz Features Page." Online. Viewed May 3, 2006. www.babyz.net/features.html, 1 page.
"Babyz". Wikipedia online reference. Viewed May 1, 2006. http://en.wikipedia.or.q/wiki/babyz, 2 pages.
Northwestern University CS395, Game Design Course "Simulation and Modeling: Under the Hood of the Sims", Spring 2002. http://www.cs.northwestern.edu/%7Eforbus/c95-gd/lectures/The_Sims_Under_the_Hood_files/frame.htm, 32 pages.
Simpson, Dan. "The Complete Sims Guide" Feb. 6, 2005, pertinent sections printed from the Internet, may also be found in its entirety at: http://www.neoseeker.com/resourcelink.html?rlid=16238&rid=15516, 18 pages.
"Sequence Paradium 2—Laughter in the Dark—Tactical Guidebook", First Edition, Keibunsha Inc., Feb. 10, 2005, pp. 5-32.
Examiner's Affidavit, dated Nov. 9, 2005, 5 pages.
Stern, Andrew. "Andrew Stern". Online. Viewed Apr. 28, 2006. http://quvu.net/andrew/resume.html, 6 pages.
Stewart, Nick. "The Adrenaline Vault Review of the Sims", Mar. 9, 2000. Printed from the Internet, 5 pages.
Decision to Grant / Notice of Allowance dated Jun. 3, 2014 in JP 2010167803 filed Jul. 27, 2010.
"Office Action", Japan Patent Application No. 2003-288128, dated Mar. 15, 2005.
"Office Action", Japan Patent Application No. 2003-288128, dated Dec. 13, 2005.
Notice of Allowance dated Oct. 31, 2012 in KR 10-2010-0072613.
"Office Action", European Patent Application No. 10007803.9, dated Sep. 29, 2014, 4 pages.
"Office Action", China Patent Application No. 201380056819.3, dated Nov. 15, 2016, 6 pages [16 pages including translation].
"Office Action," Chinese Patent Application No. 201380056819.3, dated Jun. 23, 2017, 3 pages [7 pages including translation].
"Office Action", Chinese Patent Application No. 201380056819.3, dated Dec. 18, 2017, 3 pages [7 pages including translation].

\* cited by examiner

AMBIENT LIGHT CONTROL AND CALIBRATION VIA A CONSOLE

CROSS REFERENCE TO RELATED APPLICATIONS

The present application is a continuation of U.S. patent application Ser. No. 13/663,262, filed on Oct. 29, 2012 and titled "Ambient Light Control and Calibration via Console," (now U.S. Pat. No. 9,833,707 issued Dec. 5, 2017) which is hereby incorporated by reference herein in its entirety, including all references and appendices cited therein.

FIELD OF THE PRESENT TECHNOLOGY

The present technology relates generally to ambient light control via a console, such as a gaming system. The present technology may allow for virtual lighting schemas of a virtual environment to be replicated by light emitting nodes distributed throughout a physical user environment, such as a room.

SUMMARY OF THE PRESENT TECHNOLOGY

According to various embodiments, the present technology may be directed to systems that include: (a) a console that comprises a processor that executes logic to control a plurality of nodes to reproduce a virtual lighting scheme of a virtual environment in a physical user environment; and (b) each of the plurality of nodes comprising: (i) a light emitting device; (ii) a receiver that communicatively couples the node to the console; and (iii) a processor that executes logic to control the light emitting device.

The present technology may be directed to nodes that include: (a) one or more processors; and (b) logic encoded in one or more tangible media for execution by the one or more processors and when executed operable to perform operations comprising: (i) positionally calibrating by: (1) outputting calibration signals; (2) receiving calibration signals from other nodes within a user environment; and (3) calculating distances between the node and other nodes within the user environment using the calibration feedback; and (ii) providing the calculated distances to a console that is communicatively coupled to the node.

The present technology may be directed to system that include (a) a first node that comprises: (i) a light emitting device that receives light calibration signals; (ii) an audio emitter; (iii) an audio receiver that receives audio calibration signals; (iv) a processor that executes logic to: (1) control the light emitting device; and (2) calculate a relative position of the first node from light and audio calibration signals received from additional nodes within a user environment; and (b) a console that controls a plurality of nodes to reproduce a virtual lighting environment within the user environment, the first node included in a plurality of nodes which are distributed within the user environment.

The present technology may be directed to a method that includes: (a) generating a topology of nodes which are distributed throughout a physical user environment by analyzing calibration feedback received from the nodes; and (b) controlling the nodes to reproduce a virtual lighting scheme of a virtual environment in the physical user environment.

The present technology may be directed to a non-transitory machine-readable storage medium having embodied thereon a program. In some embodiments the program may be executed by a machine to perform a method. The method may comprise: (a) generating a topology of nodes which are distributed throughout a physical user environment by analyzing calibration feedback received from the nodes; and (b) controlling the nodes to reproduce a virtual lighting scheme of a virtual environment in the physical user environment.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION OF EXEMPLARY EMBODIMENTS

Figure 1:
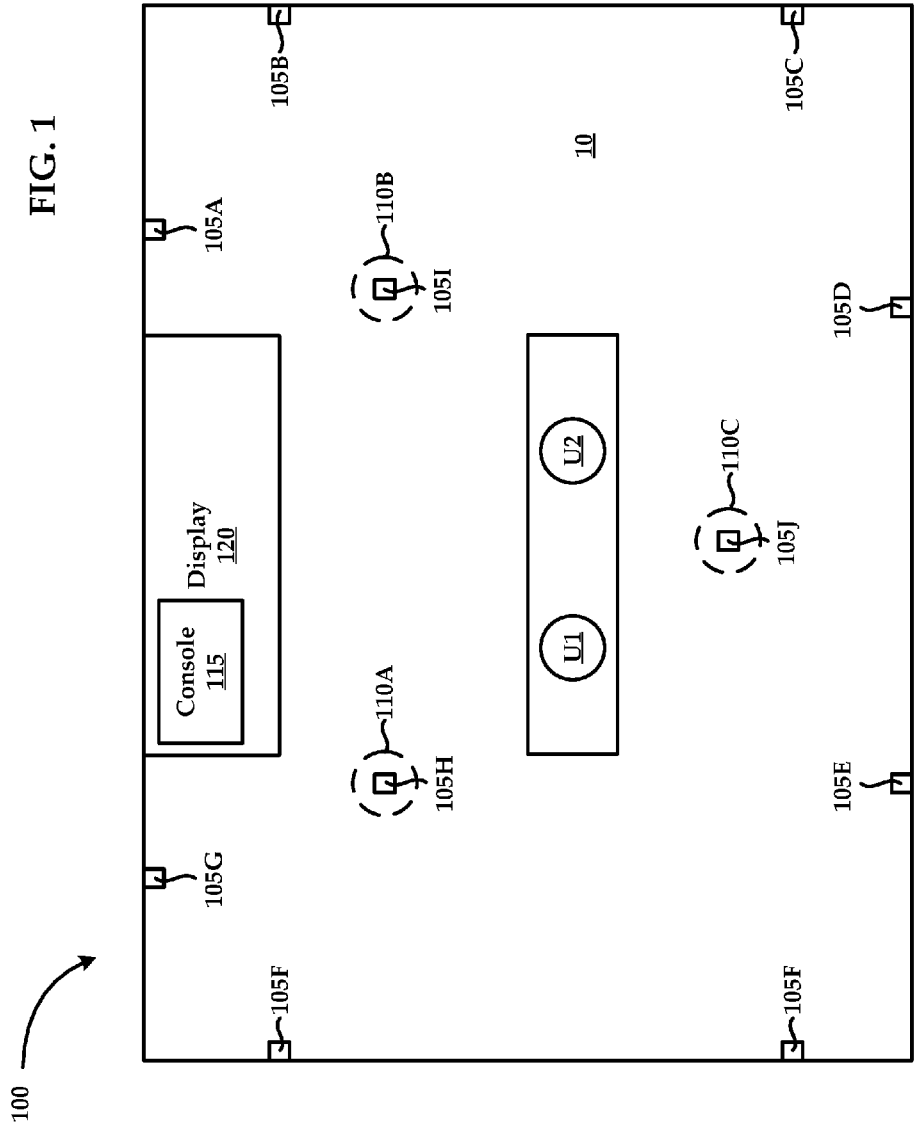
FIG. 1 illustrates an exemplary architecture for practicing aspects of the present technology.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Generally speaking, the present technology may be used to control light nodes which are distributed throughout a physical user environment, such as a room. A console may control the nodes by causing the nodes to emit light that replicates ambient lighting conditions of a virtual environment, generated, for example, by a videogame. These ambient lighting conditions may be referred to as a virtual lighting scheme.

According to some embodiments, light nodes may be plugged in to any wall outlet or inserted into any lighting fixture in a user environment. Thus, the user environment may include a plurality of light nodes that are distributed throughout.

In some stances, each of the light nodes may comprise an array of light emitting diodes (LED) that are configured to generate a spectrum of colored light. In some instances, the light node may be capable of emitting full range light but up to 440 lumens of white light. For example, the light nodes may use a multicolored (e.g., red, green, blue) "RGB" LED array. Additionally, the light node may comprise a high quality speaker, a microphone, a photo sensor capable of detecting color and intensity of light, and a reliable low latency communication receiver or transceiver which utilizes, for example, radio frequencies, infrared light, Bluetooth, power-line, or WiFi communications—just to name a few. A light node may be capable of determining its location relative to other light nodes within the user environment using various calibration techniques which will be described in greater detail below.

A console may emit a surround audio stream, decode the stream, and re-encode the stream based on predictions regarding what audio signals should be emitted from the current locations of the light nodes, or a closes approximation thereof. The console may also emit a light control stream to control the light emitted from each of the light nodes based upon a virtual lighting schema generated, for example, by a videogame.

Using calibration data obtained from the light nodes, the console may create an accurate map or topology of the user environment. The videogame may provide its ambient lighting conditions to a system library. Thus, the system library and the map of the user environment may be used together by the console to control operation of the light nodes.

The console may continually monitor and control the operation of the light nodes such that the light emitted by the light nodes corresponds to dynamically changing ambient lighting conditions of a virtual gaming environment. Advantageously, the present technology may be used to augment a videogame experience by bringing audio and lighting effects from the virtual world in to the physical world. The present technology may create a more immersive gaming experience in an inexpensive and easy to configure manner.

These and other advantages of the present technology will be described in greater detail below with reference to the collective drawings (e.g., FIGS. 1-3).

Figure 2:
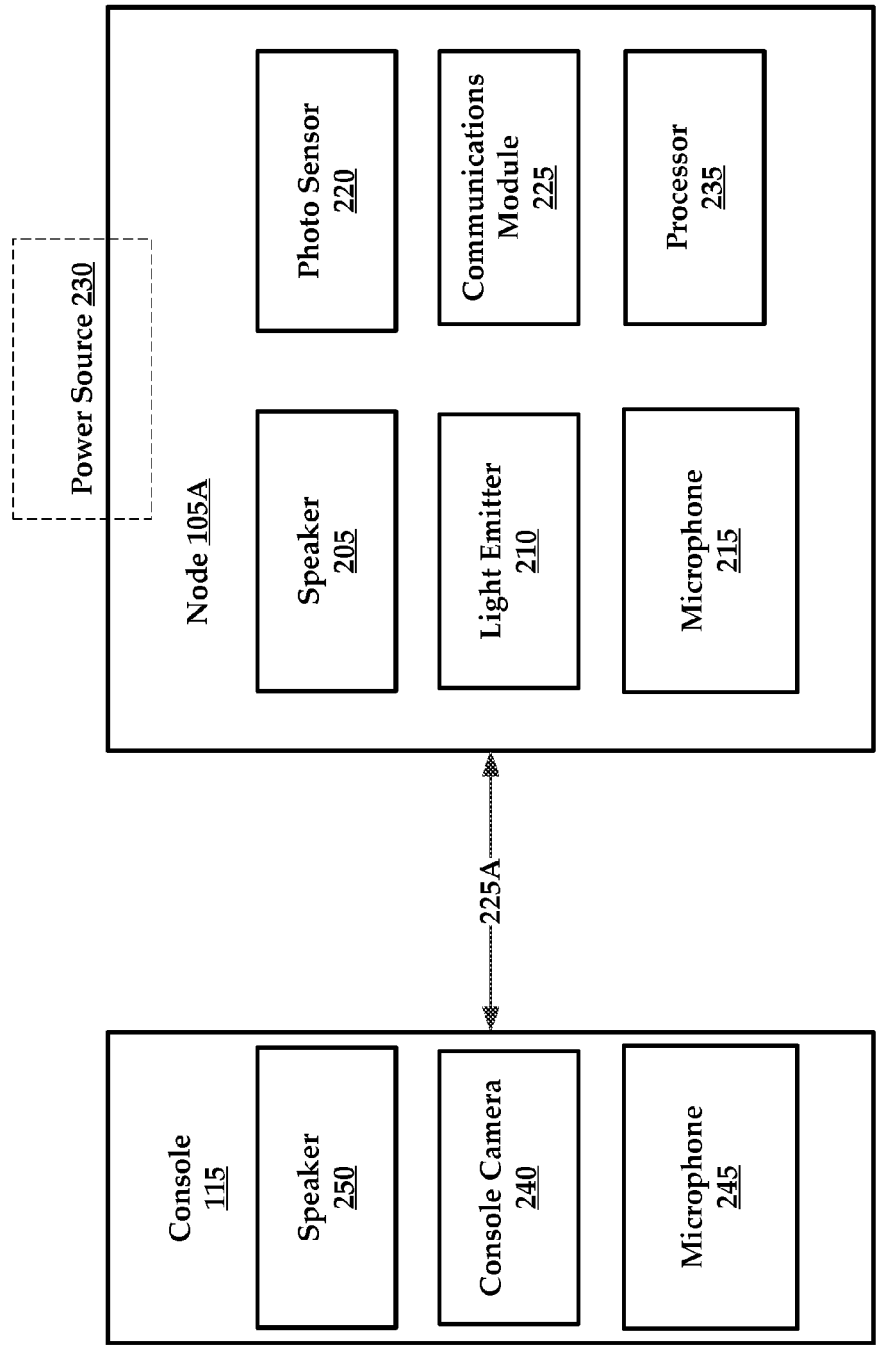
FIG. 2 illustrates block diagrams of an exemplary console and an exemplary node.

FIG. 1 illustrates an exemplary architecture 100 for practicing aspects of the present technology. According to some embodiments, the exemplary architecture 100, hereinafter "architecture 100," may generally comprise a plurality of nodes, such as light nodes 105A-J, which is shown as being distributed around a physical environment such as a user environment 10.

In some instances, nodes 105A-G are each coupled to a different electrical outlet. Nodes 105H-J are each coupled with a different light fixture, such as a potted ceiling lights 110A-C. Each of the nodes 105A-J are communicatively couplable with a console 115 using, for example, a wired connection or wireless connection, such as WiFi, Bluetooth, near field communications (NFC), radio frequency, as well as any other wired or wireless connection type that would allow for transmission of audio and/or light related signals.

Generally, the console 115 may include a dedicated device that cooperates with, for example, a display 120. For example, the console 115 may comprise a gaming system, set top box, or other similar device. An exemplary console 115 is described in greater detail below with reference to FIG. 2.

Each of nodes 105A-J is substantially similar in construction and function relative to one another. Therefore, for purposes of brevity, an exemplary light node, such as node 105A will be described in greater detail below. FIG. 2 also illustrates an exemplary node, such as node 105A, constructed in accordance with the present disclosure. In some embodiments, node 105A may comprise a speaker 205 and a light emitter 210. According to some embodiments, the light emitter 210 may include an LED light array that is capable of emitting a very bright full spectrum of light. Additionally, the node 105A may comprise a microphone 215 and a photo sensor 220 capable of sensing intensity and color of environmental lighting conditions within a physical environment, such as the user environment 10 of FIG. 1.

More specifically, the speaker 205 may comprise a speaker capable of producing high quality audio output. The speaker 205 may produce audio output in the 20 Hz to 48 kHz range (e.g., the ability to emit ultra-sound frequencies can be used as an advantage). The speaker 205 may also produce a lower frequency range response in some instances. Thus, the speaker 205 may produce audio output that augments or replaces a sound system, such as a mono, stereo, or multichannel sound system (e.g., surround sound).

The LED array of light emitter 210 may comprise RGB LED lighting in an array form that could emit light in the range of 450 lumens of white light maximum, as well as 200 lumens of any possible color the LED array is designed to emit. In some instances, the LED array may be controllable across a desired lumens range with a granularity of approximately 256 intensities per RGB LED element, although other ranges and granularity factors may also likewise be utilized in accordance with the present technology. While the node 105A has been described as including an LED array, it will be understood that the node 105A may comprise any type or combination of lighting elements such as fluorescent, compact fluorescent, incandescent, or any other lighting element that would be known to one of ordinary skill in the art with the present disclosure before them.

In some instances, the nodes 105A-J may be connected to the main power supply for the house (e.g., when associated with an outlet or lighting fixture). When the nodes 105A-J operated in an "always on" mode, heat generated by the nodes 105A-J may prove problematic. Thus, the LED array selected may be capable of generating 10 W RGB LED light, which will emit approximately 450 lumens of light (equivalent of 40 W incandescent).

In accordance with the present disclosure, the microphone 215 (e.g., sound transducer or transceiver) may include a microphone capable of being sampled at up to 192 kHz. The sample quality produced by the microphone 215 may vary according to design requirements, although a microphone with an eight-bit resolution may be utilized, in an exemplary embodiment.

In some instances, the photo sensor 220 may comprise a broad-spectrum photo sensor that can detect the intensity and color of light. Therefore, the photo sensor 220 may be used to view ambient lighting conditions of the user environment 10 as well as calibrate the light output of the LED arrays of other nodes as elements within an LED array produce light output that varies with the age of the LED array and temperature at which the LED array is operating.

In some instances, the node 105A may comprise a communications module 225 that allows the node 105A to communicatively couple with other nodes in the area. The communications module 225 may also allow the node 105A to communicatively couple with a control device, such as the console 115. The communications module 225 may utilize any one or more communications media, including, but not limited to, RF, Bluetooth, WiFi, and power-line transmission—just to name a few.

In some instances, the communications module 225 may utilize a primary communications media 225A, such as power line transmission, and an auxiliary media, such as low range Bluetooth. The auxiliary media may be used when the primary communications media is not be reliable enough or unavailable.

The node 105A may also comprise power source 230 which provides electrical energy to each of the various components of the node 105A. Alternatively, in some instances, the node 105A may comprise an interface, which allows the node 105A to electrically couple with, for example, an outlet, a light fixture, or other similar electrical interface that would allow a light fixture to receive power from a power source.

According to some embodiments, the node 105A is an "always on" device. In other instances, the node 105A may employ a stand-by mode that would allow for a significant reduction in power consumption levels relative to a standard night light (e.g., less than one watt if night light mode is active). In stand-by mode, the node 105A may monitor environmental lighting levels via the photo sensor 220 and activate the LED array of light emitter 210 to create a minimum light level within user environment 10 (or a section of user environment 10). The microphone 215 may detect a movement or other presence within the user environment 10, which may indicate a need for ambient lighting within the user environment 10.

The node 105A may also comprise a processor 235, which executes instructions stored in memory to perform the various methods or features of the node 105A. That is, the processor 235 may comprise a microprocessor, system on a chip, or an application-specific integrated circuit that causes the node 105A to perform the various methods that will be described in greater detail below. According to some embodiments, the processor 235 may comprise a microprocessor having sufficient computing power to perform the various digital signal processing capabilities required to produce and mix audio and light signals received by the microphone 215 and the photo sensor 220 of the node 105A to determine a virtual location for the node 105A.

Figure 3:
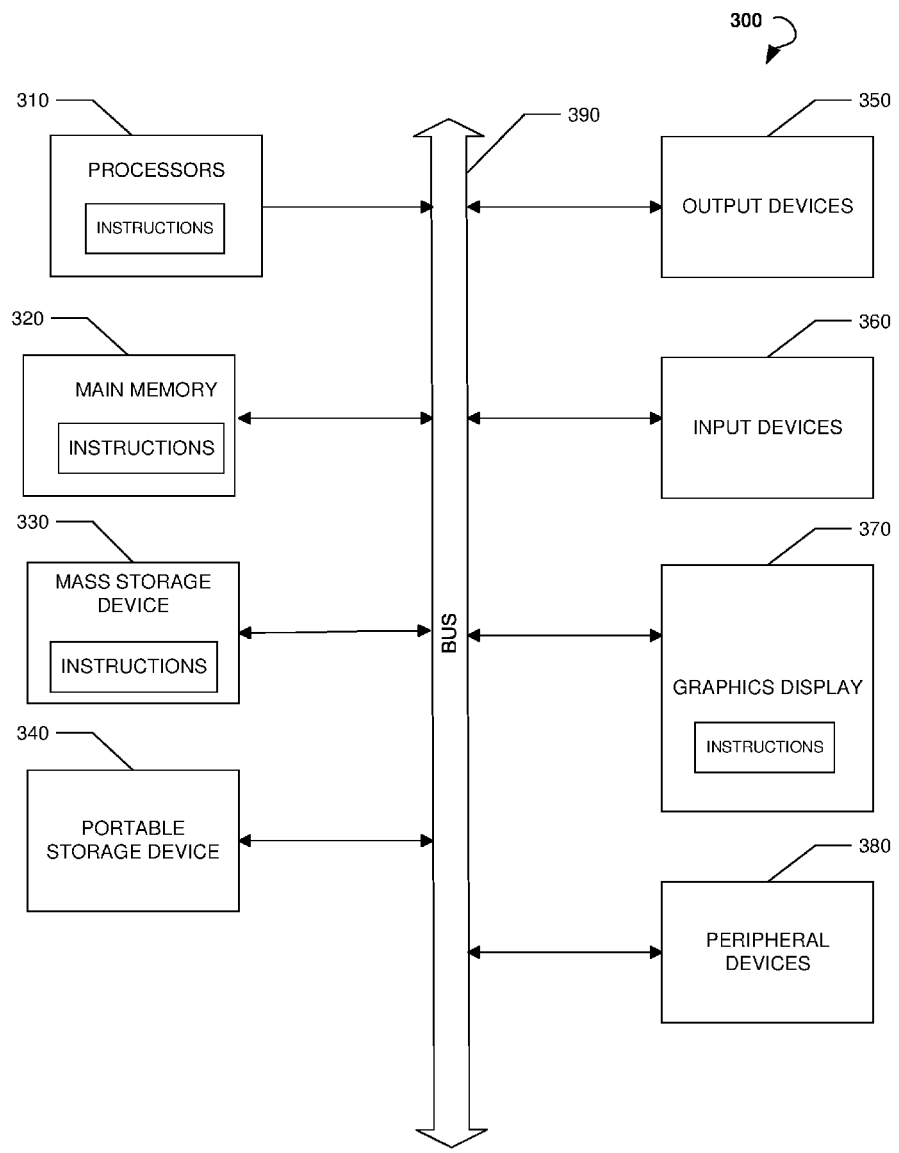
FIG. 3 is a block diagram of an exemplary computing system for implementing embodiments of the present technology.

In addition to a processor having instructions, the node 105A may include other components of a computing device, such as the computing device 300 described in greater detail relative to FIG. 3.

In some embodiments, exemplary nodes may be constructed to resemble typical light features such as light bulbs, night lights, sconces, and so forth. Thus, these exemplary nodes may be used in place of their common counterparts.

Generally speaking, in an exemplary operation, an end user would plug in a plurality of nodes 105A-J (or any desired number of nodes) in to a desired power source or a power source for which the nodes have been configured to interface with, be it in a light-bulb form or night-light form. An auto calibration program may be executed on the console 115 that cause the nodes 105A-J to utilize LED arrays, speakers, photo sensors, and microphones to calibrate audio and lighting characteristics of the user environment 10.

In some instances, the console 115 may comprise an exemplary gaming console such as the Sony PlayStation™. The console 115 may utilize integrated or periphery devices to augment positional information calculated by the nodes 105A-J. For example, the console 115 may utilize a PlayStation Eye™ camera to determine positional information such as a quadrant of the user environment in which a node is located, a relative distance between each of the nodes and the console. The console 115 may also determine if one or more of the nodes 105A-J are obscured. The various types of calibration information determined from the nodes 105A-J and/or the console may be used to generate or improve a representation of the user environment utilized by the console 115.

Indeed, the console 115 may automatically detect the addition or removal of a node from the user environment 10. Once detected, the console 115 may automatically suggest running a calibration for the nodes again. Such automated behaviors of the console 115 may minimize the amount of technical knowledge required by the end-user when installing such a system.

The console 115 may execute a calibration program to cause the console 115 to emit a series of sounds from a speaker 250 associated with the console. The console 115 may also cause the nodes 105A-J to emit sound and light signals. The console 115 may use the node calculated location information retrieved from the nodes 105A-J, as well as augmenting information obtained from a console camera 240 and a microphone 245. Using these various types of information, the console 115 may calculate characteristics of the user environment 10, which would be used to map the user environment 100.

During this calibration process, the console 115 may generate something which resembles a fireworks show to allow the calibration to be executed in a manner which is pleasant and appealing to the end user. It is noteworthy that in an exemplary console 115 power-up sequence, audio/video could be used to verify current conditions within the user environment 10. The calibration sequence may contain appropriate sections of audio and lighting flashes that can be used to calibrate the audio and lighting characteristics of the user environment 10.

Once calibrated, the console 115 may have an approximate indication of where the nodes 105A-J are located with respect to each other, how far apart the nodes 105A-J are, relative to one another and/or the console 115, and whether or not the nodes 105A-J are occluded in some fashion.

As described above, each of the nodes 105A-J may utilize the various components described above to generate and detect light and audio signals to determine a location relative of a give node relative to other nodes in the user environment 10.

In an exemplary configuration sequence a first node 105A may output a flash of light from an LED array. At the same time, the first node 105A may emit a sound. Additional nodes such as nodes 105B, 105C, and 105D (total number is unlimited) each detect the light output by the first node 105A and time how long it takes for the audio signal from the first node 105A to arrive. The length of time between receipt of the light signal and the audio signal may be used by another node to determine an approximate distance between the first node 105A and the receiving node. Indeed, since sound travels at 330 meters/sec, if the nodes comprise a microphone that is capable of generating a sampling accuracy of 192 khz, the receiving node can determine a distance to within approximately 20 millimeters. Although, it will be understood that any obscuring objects may affect the audio travel time to some degree.

Each of the nodes 105A-J would execute this output sequence, which is received by the other receiving nodes. Each of the nodes 105A-J may then transmit its calibration feedback to the console 115. In some instances, the console 115 may use the calibration feedback to form a topology of the user environment 10 with an accurate indication of how nodes 105A-J are positioned within the user environment 10 relative to each other. Given enough nodes with enough separation, an additional parameter of height may also be determined. Thus, the calibration feedback augmented with height data may be used to generate a three dimensional representation of the nodes 105A-J within the user environment 10.

When the console 115 is activated in a configuration mode, the console 115 may retrieve the calibration feedback from the nodes 105A-J and then confirm the relative locations of the nodes 105A-J with measurements generated by the console 115 using the console camera 240 (e.g., the PlayStation Eye™) camera to augment the relative node position data of the nodes 105A-J. The camera may determine height information of each of the nodes 105A-J, whether or not the nodes 105A-J are obscured, what direction the nodes 105A-J may be pointing, as well as relative positions of the nodes 105A-J to any other audio emitting devices in the user environment, such as a surround sound system.

Once the calibration feedback has been obtained and/or calculated, pictures of the user environment may be obtained by the console 115 using the console camera 240. For example, pictures may be taken when the nodes 105A-J have activated their lights in sequence to allow acquisition of depth information on objects by projecting and detecting the direction of shadows generated by objects within the user environment 10. This sequence may also be used even if the nodes are outside the direct field of view of the camera, as a shadow cast by a node may provide relative position information of nodes or objects with the user environment 10.

In some embodiments, the console camera 240 may be adapted to detect infra-red light. The LED arrays from light emitter 210 of the nodes 105A-J may be tuned to emit a color in the infra-red range. In other instances, each node may include a dedicated IR transceiver that may broadcast and/or received IR signals.

The detection of IR signals may also allow for the detection and tracking of the movement of objects within the user environment 10 with greater level of accuracy than obtaining images of the user environment with the console camera 240.

According to some embodiments, a program such as a videogame, which is being facilitated by the console 115, may desire to control environmental lighting (e.g., nodes 105A-J) of the user environment 10. Generally, executable code within the program may indicate to a system library used by the console 115 where ambient lights are within a virtual environment. The location and operation of ambient lights within the virtual environment may be referred to as a virtual lighting scheme.

The console 115 can then use the virtual lighting scheme to control the nodes 105A-J within the user environment 10 to approximately match the lighting within the virtual environment. In some instances, the system library may be updated frequently to match activity occurring within the program. Thus, lighting elements used by the nodes 105A-J and controlled by the console 115 can be used to produce light conditions within the user environment that approximate the lighting conditions within the virtual environment which is being displayed to an end user.

During game play, depth information captured by the console camera 240 associated with the console 115 may be used to augment the replication of the lighting conditions of the virtual environment. That is, because the console 115 knows the location of all of the nodes 105A-J, the console 115 can control the nodes 105A-J to cause them to act in a particular desired sequence. During operation, the images of the user environment may be captured and then used, along with the known location information of the nodes 105A-J, to create motion vectors that describe how shadows move within the user environment. These motion vectors may be used by the console 115 to create additional three-dimensional depth information than would otherwise be impossible with just the camera alone.

By way of non-limiting example, if an end user is playing a videogame and the ambient light is bright within the videogame environment, the console 115 may cause the nodes 105A-J to use their respective lighting elements to light up the entire user environment. In contrast, if an end user enters an area of a virtual environment where there are lots of "Zombies," the console 115 may progressively darken the user environment down to a sinister red color. The red color may be generated from controlling nodes that are positioned behind or in front of users U1 and U2. The change in lighting may foreshadow danger. The console 115 may cause a multicolor LED array of one or more nodes to emit colored light in accordance with color parameters included in the virtual lighting scheme being used by the console 115.

In an additional example, if there are flickering lanterns in a hallway within a virtual environment, the console 115 may cause various nodes within the user environment to flicker in accordance with their positions within the virtual environment. For example, if an end user within the virtual environment passes a flickering light in the virtual environment, nodes assigned to similar positions within the user environment would flicker sequentially from front to behind or vice versa as the end user passes the virtual light within the virtual environment.

In an additional example, if a gun-shot occurs behind an end user in a virtual environment, a node may briefly flash one of the light emitters to indicate the gun fire, in a directional fashion. Because the console 115 knows where nodes are located within the user environment, the console 115 may use the nodes to "move" light that is occurring across a virtual scene within the user environment to give an indication of movement within the user environment. In another example, when a flash grenade is used within a virtual environment, the nodes within the user environment can flash bright and fade down, as would occur within the virtual environment.

Additionally, a light emitter (e.g., LED array) within a node may be positioned in such a way that the console 115 can control the projection of the light in a non-linear fashion from the node. For example, if the node includes an LED array, the console 115 may use the LED array to emit light in a fan shape so that the console 115 has broader control of light emitted within the user environment in the area of the node.

Alternative uses for the present technology may include controlling ambient lighting within a room to reduce unnecessary lighting of unoccupied rooms. In an exemplary embodiment, the nodes (or other devices within a room) emit ultrasonic frequencies. These ultrasonic frequencies may be detected by the nodes and used for echo location of objects within the user environment 100. The echo location data generated may be used to track object movement, direction, and velocity within a user environment.

Additionally, since the console 115 provides a centralized control mechanism, user environment lighting via the nodes may be adjusted based on personal preference, time of day, other devices in operation, or other metrics that may be used to change user environment lighting that would be known to one of ordinary skill in the art.

Additionally, in some embodiments, using analysis of the images that are being processed through the console 115, the audio and visual environment from a movie may be replicated in the user environment while end users are watching the movie.

In some embodiments, rather than control sequences being determined or read from a program at the console, a control stream may be sent to the console 115, or directly to the nodes 105A-J to actively manage the user environment lighting characteristics in a manner controlled by the director of a movie. The control stream may be received along with a corresponding video stream.

As used herein, the term "module" may also refer to any of an application-specific integrated circuit ("ASIC"), an electronic circuit, or a processor (shared, dedicated, or group) that executes one or more software or firmware programs, a combinational logic circuit, and/or other suitable components that provide the described functionality. In other embodiments, individual modules may include separately configured web servers.

FIG. 3 illustrates an exemplary computing system 300 that may be used to implement an embodiment of the present technology. The computing system 300 of FIG. 3 may be implemented in the contexts of the likes of computing systems, networks, exchanges, servers, or combinations thereof disclosed herein. The computing system 300 of FIG. 3 includes one or more processors 310 and main memory 320. Main memory 320 stores, in part, instructions and data for execution by processor 310. Main memory 320 may store the executable code when in operation. The computing system 300 of FIG. 3 further includes a mass storage device 330, portable storage device 340, output devices 350, input devices 360, a graphics display 370, and peripheral devices 380.

The components shown in FIG. 3 are depicted as being connected via a single bus 390. The components may be connected through one or more data transport means. Processor 310 and main memory 320 may be connected via a local microprocessor bus, and the mass storage device 330, peripheral device(s) 380, portable storage device 340, and graphics display 370 may be connected via one or more input/output (I/O) buses.

Mass storage device 330, which may be implemented with a magnetic disk drive or an optical disk drive, is a non-volatile storage device for storing data and instructions for use by processor 310. Mass storage device 330 may store the system software for implementing embodiments of the present technology for purposes of loading that software into main memory 320.

Portable storage device 340 operates in conjunction with a portable non-volatile storage medium, such as a floppy disk, compact disk, digital video disc, or USB storage device, to input and output data and code to and from the computing system 300 of FIG. 3. The system software for implementing embodiments of the present technology may be stored on such a portable medium and input to the computing system 300 via the portable storage device 340.

Input devices 360 provide a portion of a user interface. Input devices 360 may include an alphanumeric keypad, such as a keyboard, for inputting alphanumeric and other information, or a pointing device, such as a mouse, a trackball, stylus, or cursor direction keys. Additionally, the computing system 300 as shown in FIG. 3 includes output devices 350. Suitable output devices include speakers, printers, network interfaces, and monitors.

Graphics display 370 may include a liquid crystal display (LCD) or other suitable display device. Graphics display 370 receives textual and graphical information and processes the information for output to the display device.

Peripheral devices 380 may include any type of computer support device to add additional functionality to the computing system. Peripheral devices 380 may include a modem or a router.

The components provided in the computing system 300 of FIG. 3 are those typically found in computing systems that may be suitable for use with embodiments of the present technology and are intended to represent a broad category of such computer components that are well known in the art. Thus, the computing system 300 of FIG. 3 may be a personal computer, hand held computing system, telephone, mobile computing system, workstation, server, minicomputer, mainframe computer, or any other computing system. The computer may also include different bus configurations, networked platforms, multi-processor platforms, etc. Various operating systems may be used including Unix, Linux, Windows, Macintosh OS, Palm OS, Android, iPhone OS, or other suitable operating systems.

It is noteworthy that any hardware platform suitable for performing the processing described herein is suitable for use with the technology. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium such as RAM, PROM, EPROM, a FLASHEPROM, or any other memory chip or cartridge.

Computer program code for carrying out operations for aspects of the present invention may be written in any combination of one or more programming languages, including an object-oriented programming language such as Java, Smalltalk, C++, or the like and conventional procedural programming languages such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application and to enable others of ordinary skill in the art to understand the invention for various embodiments with various modifications as are suited to the particular use contemplated.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description but instead should be determined with reference to the appended claims along with their full scope of equivalents.

What is claimed is:

1. A system, comprising:
a console that comprises a processor that executes logic to control a plurality of nodes to reproduce a virtual lighting scheme of a virtual environment in a physical user environment, in which the console:
recognizes a location of each node in the plurality of nodes in the physical user environment; and
monitors and controls operation of each node in the plurality of nodes such that light emitted by each node in the plurality of nodes is associated with light conditions of the virtual environment; and
each of the plurality of nodes comprising:
a light emitting device;
a receiver that communicatively couples the node to the console; and
a processor that executes logic to control the light emitting device.

2. The system according to claim 1, in which the recognition of the location of each node in the plurality of nodes allows the console to direct light emitted by the plurality of nodes to correspond to activity within the virtual environment.

3. The system according to claim 2, in which the console causes the plurality of nodes to emit light in accordance with positioning of ambient lights within the virtual environment.

4. The system according to claim 1, in which the light conditions of the virtual environment are dynamically changing.

5. The system according to claim 1, in which the virtual lighting scheme includes location and operation of ambient lights within the virtual environment.

6. The system according to claim 1, in which the virtual environment is generated by a video game, the video game facilitated by the console.

7. The system according to claim 1, in which the processor of the console further executes the logic to obtain images of the physical user environment using a camera associated with the console.

8. The system according to claim 7, in which the camera associated with the console captures depth information during video game play, the depth information used to augment the reproduction of the virtual lighting scheme of the virtual environment in the physical user environment.

9. The system according to claim 1, in which the light emitting device comprises an LED array.

10. The system according to claim 9, in which the LED array comprises a multicolor light emitting LED array, in which when the virtual lighting scheme comprises color parameters, the multicolor light emitting LED array is executed to emit light that conforms to the color parameters of the virtual lighting scheme.

11. A node, comprising:
one or more processors;
a photo sensor sensing intensity and color of environmental lighting conditions within a physical user environment;
a microphone detecting a presence within the physical user environment, the presence indicating a need for ambient lighting within the physical user environment; and
logic encoded in one or more tangible media for execution by the one or more processors and when executed, operable to emit at least one of a light and a sound upon receipt of instructions from a console, the emission of the at least one of the light and the sound in the physical user environment associated with a virtual environment.

12. The node according to claim 11, in which the node includes a communications module that allows the node to communicatively couple with other nodes in the vicinity of the node.

13. A system, comprising:
a first node that comprises:
a light emitting device;
an audio emitter; and
an audio receiver;
a processor that executes logic to:
control the light emitting device; and
a console that controls a plurality of nodes to reproduce a virtual lighting scheme within a physical user environment, the first node included in the plurality of nodes which are distributed within the physical user environment, the console recognizing location of the plurality of nodes in the physical user environment, and monitoring and controlling operation of the plurality of nodes such that light emitted by the plurality of nodes is associated with light conditions of a virtual environment.

14. The system according to claim 13, in which the console:
generates a topology of nodes which are distributed throughout the physical user environment by analyzing calibration feedback received from the plurality of nodes, the topology of nodes used to create a map of the physical user environment; and
controls the plurality of nodes, using the map of the physical user environment, to reproduce the virtual lighting scheme of the virtual environment in the physical user environment.

15. The system according to claim 14, in which the console:
causes the plurality of nodes to emit light;
obtains images of the physical user environment;
analyzes shadows of objects included in the images to create motion vectors; and
updates the topology of nodes using the motion vectors.

16. The system according to claim 14, in which the console:
causes the plurality of nodes to emit light;
obtains images of the physical user environment; and
generates a three dimensional topology of the physical user environment from the images of the physical user environment and the calibration feedback.

17. The system according to claim 13, in which the console reads the virtual lighting scheme from a system library, the virtual lighting scheme including virtual lighting conditions of a video game.

18. The system according to claim 17, in which the system library is updated frequently to match activity occurring within the virtual environment.

19. The system according to claim 13, in which the console receives the virtual lighting scheme from a control stream received along with a video stream, the virtual lighting scheme including virtual lighting conditions of a movie.

* * * * *